(12) United States Patent
Egan (10) Patent No.: US 7,862,287 B2
(45) Date of Patent: Jan. 4, 2011

(54) MULTI-MOTION LIFTING AND TRANSFERRING APPARATUS AND METHOD

(76) Inventor: Thomas F. Egan, 570 Hance Rd., Binghamton, NY (US) 13903

( * ) Notice: Subject to any disclaimer, the term of this patent is extended or adjusted under 35 U.S.C. 154(b) by 529 days.

(21) Appl. No.: 11/104,672

(22) Filed: Apr. 13, 2005

(65) Prior Publication Data
US 2005/0264020 A1 Dec. 1, 2005

Related U.S. Application Data

(60) Provisional application No. 60/561,552, filed on Apr. 13, 2004.

(51) Int. Cl.
*B60P 1/00* (2006.01)
(52) U.S. Cl. .................... 414/541; 414/921
(58) Field of Classification Search ............. 414/541, 414/921, 539, 640; 280/250.1; 296/63
See application file for complete search history.

(56) References Cited

U.S. PATENT DOCUMENTS

| 360,578 | A | | 4/1887 | Francis |
|---|---|---|---|---|
| 2,792,951 | A | | 5/1957 | White |
| 3,516,559 | A | | 6/1970 | Walter |
| 3,710,962 | A | | 1/1973 | Fowler, Jr. |
| 3,896,946 | A | | 7/1975 | Forsyth et al. |
| 4,015,725 | A | | 4/1977 | Ryan et al. |
| 4,075,719 | A | | 2/1978 | Sullivan |
| 4,096,955 | A | * | 6/1978 | Dake .......... 414/541 |
| 4,140,230 | A | | 2/1979 | Pearson |
| 4,142,641 | A | * | 3/1979 | Dake .......... 414/541 |
| 4,170,368 | A | * | 10/1979 | Southward et al. ..... 280/250.1 |
| 4,226,567 | A | | 10/1980 | Van Orsdale, Jr. |
| 4,270,630 | A | | 6/1981 | Karkau |
| 4,306,634 | A | * | 12/1981 | Sangster .......... 414/663 |
| 4,365,924 | A | | 12/1982 | Brigman et al. |
| 4,398,858 | A | | 8/1983 | Paffrath |
| 4,420,286 | A | | 12/1983 | Hanson et al. |
| 4,438,640 | A | | 3/1984 | Willis |
| 4,475,861 | A | | 10/1984 | Medansky |
| 4,483,653 | A | * | 11/1984 | Waite .......... 414/541 |
| 4,545,085 | A | | 10/1985 | Feldt |
| 4,551,060 | A | * | 11/1985 | Quercy .......... 414/541 |

(Continued)

FOREIGN PATENT DOCUMENTS

DE 3123546 1/1983

(Continued)

OTHER PUBLICATIONS

Bruno Independent Living Aids; TAS-2500 Turny 300/12, Turny 395/16, and Carony Operator/Installation Manual; 48 pages.

*Primary Examiner*—Michael S Lowe (57) ABSTRACT

A multi-motion lifting and transferring apparatus and method are disclosed. The multi-motion lifting and transferring apparatus and method may be realized in primarily two versions, the first being referred to as the single linkage arm version, and the second being referred to as the dual linkage arm version. In one particular exemplary embodiment, a multi-motion lifting and transferring apparatus in accordance with the single linkage arm version may be realized as having a first pivot point for rotating an intermediary support member about a first substantially vertical axis, a second pivot point for rotating an electrically or hydraulically powered up/down extension arm about a second substantially vertical axis, and a seat support member for supporting a seat for accommodating at least one person.

20 Claims, 12 Drawing Sheets

U.S. PATENT DOCUMENTS

| | | | |
|---|---|---|---|
| 4,569,094 A | 2/1986 | Hart et al. | |
| 4,573,854 A | 3/1986 | McFarland | |
| 4,616,972 A | 10/1986 | McFarland | |
| 4,644,595 A | 2/1987 | Daniel | |
| 4,661,035 A | 4/1987 | Danielsson | |
| 4,664,584 A | 5/1987 | Braun et al. | |
| 4,671,729 A | 6/1987 | McFarland | |
| 4,685,860 A | 8/1987 | McFarland | |
| 4,786,072 A * | 11/1988 | Girvin | 280/304.1 |
| 4,797,042 A | 1/1989 | McFarland | |
| 4,801,237 A | 1/1989 | Yamamoto | |
| 4,808,056 A * | 2/1989 | Oshima | 414/462 |
| 4,809,998 A | 3/1989 | Girvin | |
| 4,955,779 A | 9/1990 | Knackstedt | |
| 5,022,106 A | 6/1991 | Richards | |
| 5,035,467 A | 7/1991 | Axelson et al. | |
| 5,040,832 A | 8/1991 | Zalewski | |
| 5,102,195 A | 4/1992 | Axelson et al. | |
| 5,154,563 A | 10/1992 | Phillips | |
| 5,160,236 A | 11/1992 | Redding et al. | |
| 5,180,275 A | 1/1993 | Czech et al. | |
| 5,193,633 A | 3/1993 | Ezenwa | |
| 5,201,377 A | 4/1993 | Wilson | |
| 5,205,697 A | 4/1993 | Getty et al. | |
| 5,261,779 A | 11/1993 | Goodrich | |
| 5,308,214 A | 5/1994 | Crain et al. | |
| 5,333,333 A | 8/1994 | Mah | |
| 5,348,172 A | 9/1994 | Wilson | |
| 5,375,913 A | 12/1994 | Blanchard | |
| 5,431,526 A | 7/1995 | Peterson et al. | |
| 5,456,335 A | 10/1995 | Kinsey | |
| 5,456,568 A | 10/1995 | Kirby et al. | |
| 5,459,891 A | 10/1995 | Reeve et al. | |
| 5,467,813 A | 11/1995 | Vermaat | |
| 5,502,851 A | 4/1996 | Costello | |
| 5,540,539 A * | 7/1996 | Wolfman et al. | 414/541 |
| 5,542,811 A * | 8/1996 | Vartanian | 414/541 |
| 5,560,054 A | 10/1996 | Simon | |
| 5,617,963 A * | 4/1997 | Baziuk et al. | 212/179 |
| 5,639,105 A | 6/1997 | Summo | |
| 5,649,329 A | 7/1997 | Horcher et al. | |
| 5,682,630 A | 11/1997 | Simon | |
| 5,746,563 A * | 5/1998 | Steckler | 414/462 |
| 5,845,348 A | 12/1998 | Dunn et al. | |
| 5,857,832 A | 1/1999 | Al-Temen et al. | |
| 5,987,664 A | 11/1999 | Somerton et al. | |
| 6,026,523 A | 2/2000 | Simon et al. | |
| 6,042,330 A * | 3/2000 | Egan | 414/680 |
| 6,223,364 B1 * | 5/2001 | Egan | 5/81.1 R |
| 6,260,218 B1 | 7/2001 | Tsuga | |
| 6,283,528 B1 | 9/2001 | Townsend | |
| 6,289,534 B1 | 9/2001 | Hakamiun et al. | |
| 6,367,103 B1 | 4/2002 | Collins | |
| 6,595,738 B2 * | 7/2003 | Rock et al. | 414/541 |
| 6,612,802 B2 * | 9/2003 | Egan | 414/539 |
| 6,739,642 B1 | 5/2004 | Egan | |
| 6,823,541 B2 | 11/2004 | Egan | |
| 7,207,765 B1 * | 4/2007 | Egan | 414/541 |
| 7,284,944 B1 * | 10/2007 | Schlangen | 414/541 |
| 7,383,107 B2 * | 6/2008 | Fehr et al. | 701/25 |

FOREIGN PATENT DOCUMENTS

| | | | |
|---|---|---|---|
| JP | 11253492 A * | 9/1999 | |
| JP | 2001315565 A * | 11/2001 | |
| JP | 2004195062 A * | 7/2004 | |
| SU | 1484678 A | 6/1989 | |

* cited by examiner

FIG. 4B

MULTI-MOTION LIFTING AND TRANSFERRING APPARATUS AND METHOD

CROSS-REFERENCE TO RELATED APPLICATIONS

This patent application claims priority to U.S. Provisional Patent Application No. 60/561,552, filed Apr. 13, 2004, which is hereby incorporated by reference herein in its entirety.

FIELD OF THE DISCLOSURE

The present disclosure relates generally to devices and methods for lifting and transferring persons into and out of vehicles and, more particularly, to a multi-motion lifting and transferring apparatus and method for assisting persons when entering and exiting a vehicle.

BACKGROUND OF THE DISCLOSURE

Difficulties are often encountered when transferring disabled persons from one location to another. Particularly in the case of wheelchair-bound persons, it is often quite difficult to lift and transfer such persons to and from their wheelchair from and to, for example, a motor vehicle. One or more persons are usually required to assist the disabled person.

There have been some inventive efforts directed at alleviating the problems associated with transferring disabled persons from one location to another. For example, in U.S. Pat. No. 4,365,924, Brigman et al. disclose a disabled person transfer device for transferring a disabled person from a wheelchair to a vehicle. Also, in U.S. Pat. No. 5,459,891, Reeve et al. disclose a hydraulically powered lift and transport apparatus for lifting and transporting wheelchair bound persons. In U.S. Pat. No. 6,223,364, Egan discloses a multi-motion lifting and transferring apparatus for assisting persons when entering and exiting a vehicle.

The aforementioned patents disclose devices which allow a disabled person to be lifted from a wheelchair or a bed and transferred to another location. However, the devices disclosed in both of these patents, as well as other known devices, have drawbacks in the areas of cost and complexity which could limit the potential mobility of a disabled individual. For instance, the disabled person transfer device disclosed in U.S. Pat. No. 4,365,924 requires extensive modifications to a vehicle as well as a modified wheelchair for use with the device. The device disclosed in U.S. Pat. No. 6,223,364 is incompatible with the functional and installation requirements of certain combinations of vehicles and users, in particular when a vehicle has a relatively small door opening and structural obstructions in the exit path of the seat, when users require extra legroom and a rearward motion of the seat prior to turning and exit. Also, the lift and transport apparatus disclosed in U.S. Pat. No. 5,459,891 requires a remotely located hydraulic pump and 120 VAC current to power the various components of the apparatus. The Turny turning automotive seat product manufactured by Bruno Corporation in the United States overcomes certain legroom restrictions with a limited rearward motion prior to exiting, however does not overcome many vehicle structures and other obstructions in the seat is exiting the vehicle. Similar drawbacks exist for other known lifting and transferring devices.

In view of the foregoing, it would be desirable to provide a lifting and transferring apparatus for assisting persons when entering and exiting a vehicle which overcomes the above-described inadequacies and shortcomings.

SUMMARY OF THE DISCLOSURE

A multi-motion lifting and transferring apparatus and method are disclosed. The multi-motion lifting and transferring apparatus and method may be realized in primarily two versions, the first being referred to as the single linkage arm version, and the second being referred to as the dual linkage arm version. In one particular exemplary embodiment, a multi-motion lifting and transferring apparatus in accordance with the single linkage arm version may be realized as having a first pivot point for rotating an intermediary support member about a first substantially vertical axis, a second pivot point for rotating an electrically or hydraulically powered up/down extension arm about a second substantially vertical axis, and a seat support member for supporting a seat for accommodating at least one person. In another particular exemplary embodiment, a multi-motion lifting and transferring apparatus in accordance with the multiple linkage arm version may be realized as having a first pivot point for rotating a first intermediary support member about a first substantially vertical axis, a second pivot point for rotating a second intermediary support member about a second substantially vertical axis, a third pivot point for rotating an electrically or hydraulically powered up/down extension arm about a third substantially vertical axis, and a seat support member for supporting a seat for accommodating at least one person. Additional flexibility in overcoming vehicle structural obstructions may be gained by adding additional pivot points.

In accordance with other aspects of these particular exemplary embodiments, the pivot points may rotate throughout a 360 degree motion, as allowed by vehicle structures and other constraints.

In accordance with further aspects of these particular exemplary embodiments, the first intermediary support member pivots about the first substantially vertical axis, allowing for initial rearward motion (e.g., towards the rear of a vehicle) of the seat and seat support member to increase ergonomic ease and legroom, followed by a reverse rotation which moves the second pivot point closer to a door opening space. In the case of the single linkage arm version, the second pivot point, rotating about the second substantially vertical axis, then facilitates the rotation of the hydraulically or electrically powered up/down extension arm to position the attached seat support member and seat optimally within a door opening space. In the case of the multiple linkage arm version, the second pivot point, rotating about the second substantially vertical axis, then facilitates the rotation of the second intermediary support member, connected via the third pivot point rotating about the third substantially vertical axis to the hydraulically or electrically powered up/down extension arm to position the attached seat support member and seat optimally within a door opening space.

In accordance with additional aspects of these particular exemplary embodiments, the seat support member is secured by a latching mechanism which allows for entry from a frontward direction, an intermediary latching position, and exit towards a rearward direction when released. This allows for the rearward motion of the seat prior to exit when exiting a vehicle or docking when entering a vehicle. The latching mechanism may include a release mechanism so as to allow manual operation.

In accordance with still other aspects of these particular exemplary embodiments, the pivot points may be electrically actuated to rotate each support member. The electrically actuated rotators may comprise an electrical or optical rotation measurement device for aiding a controller to memorize optimal motions. The electrically actuated rotators may also or alternatively comprise, in associated control circuitry, a door sensor electrical or optical switch, for preventing operation of the apparatus when a vehicle door is closed. The electrically actuated rotators may also or alternatively comprise, in associated control circuitry, electrical current load sensors, for preventing rotation of the apparatus when a barrier such as a human body part or other obstacle is encountered. The electrically actuated rotators may also or alternatively comprise, in associated control circuitry, optical sensors or electrical switches, for preventing rotation of the apparatus when a barrier such as a human body part or other obstacle is encountered in key obstruction areas.

In accordance with still further aspects of these particular exemplary embodiments, fore and aft sliding of the seat by means of slide tracks may be incorporated into an exit or entry motion to facilitate seat clearance with interfering vehicle structure, particularly in a rocker panel area at a bottom of a door opening. This motion may be activated by an electrical extension arm or motor and comprise an electrical or optical rotation measurement device to provide information to an electrical controller.

In accordance with still additional aspects of these particular exemplary embodiments, the electrically actuated rotators and the hydraulically or electrically powered up/down extension arm are preferably electrically configured to operate from a common control unit. This unit may have the capability of gathering input data provided by electrical or optical movement measurement devices on the electrically actuated rotators and the hydraulically or electrically powered up/down extension arm, and then storing this data to repeat precise combinations of motor movements. The common control unit may also comprise a remote control unit, or a hard wired modular control unit, for human input.

In accordance with yet still other aspects of these particular exemplary embodiments, one or more of the electrically actuated rotators and the hydraulically or electrically powered up/down extension arm may include limit switches for preventing excessive movement and/or rotation inward or outward or upwards or downward.

In accordance with yet still further aspects of these particular exemplary embodiments, at least one of the electrically actuated rotators and the electrically actuated slide tray may beneficially include a release mechanism so as to allow manual operation. Similarly, the hydraulically or electrically powered up/down extension arm may beneficially include a mechanical crank so as to allow manual operation.

The present invention apparatus and method is typically used to transfer disabled persons in and out of vans, trucks, recreational vehicles, and other vehicles, but can also be used to transfer persons and/or things for other purposes.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1A:
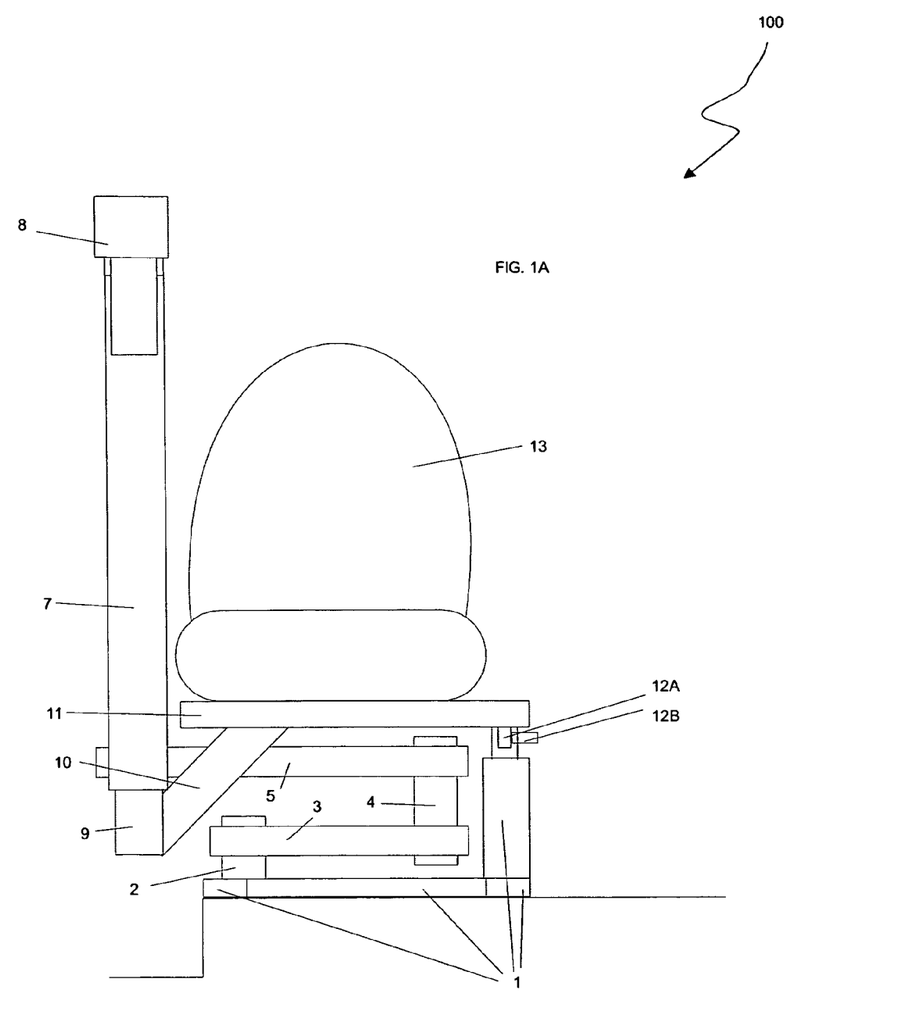
FIG. 1A is a front view of a multiple linkage arm version of a multi-motion lifting and transferring apparatus with the unit fully retracted and forward facing as it would be in a vehicle when traveling in accordance with an embodiment of the present disclosure.
Figure 1B:
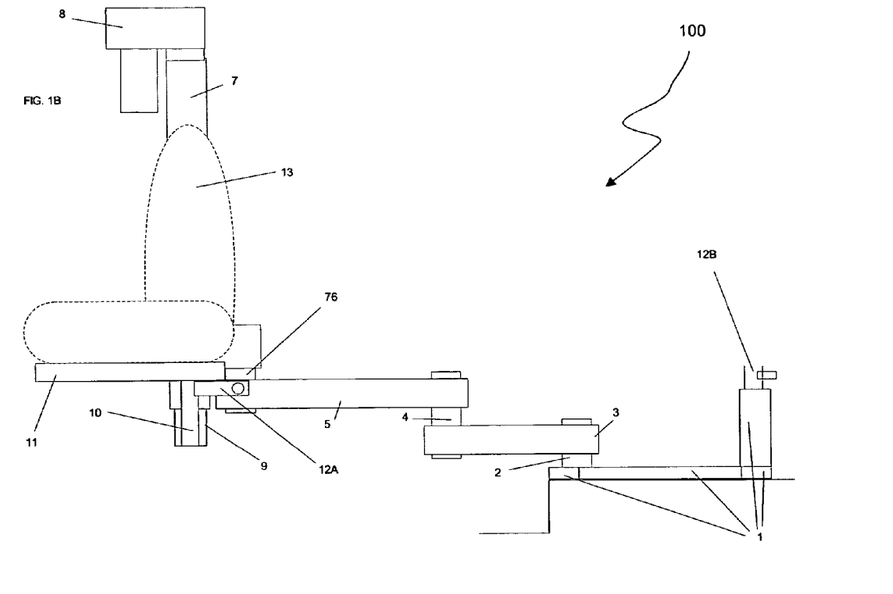
FIG. 1B is a front view of the multi-motion lifting and transferring apparatus shown in FIG. 1A with a resident seat rotated to a ninety degrees position and extended outward and fully lowered in accordance with an embodiment of the present disclosure.
Figure 1C:
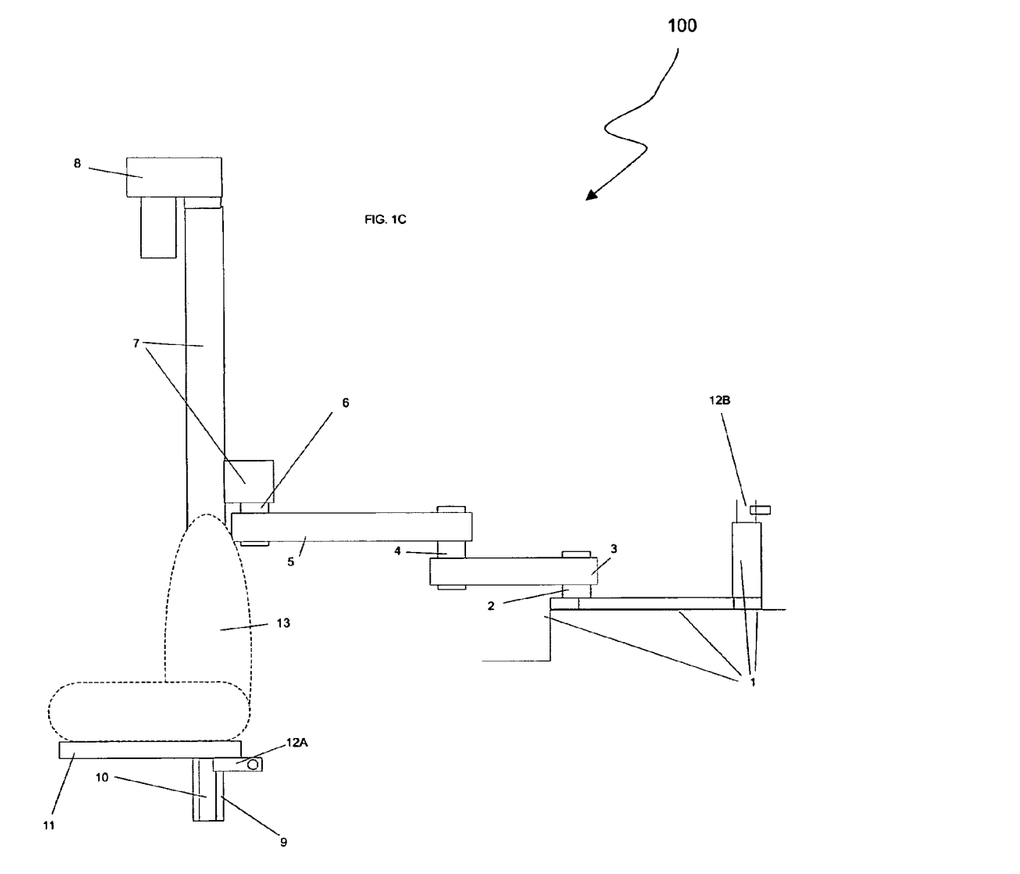
FIG. 1C is a front view of the multi-motion lifting and transferring apparatus shown in FIG. 1A with the resident seat rotated to the ninety degrees position and fully lowered in accordance with an embodiment of the present disclosure.

Referring to FIGS. 1A-1C, there is shown a multi-motion lifting and transferring apparatus 100 in accordance with an embodiment of the present disclosure in three respective positions. Beginning from the bottom of the apparatus 100 upward, the apparatus 100 includes a base support assembly 1 for securely mounting the apparatus 100 to, for example, the floor of a vehicle or other structure. The apparatus 100 also includes a pivot point 2 allowing horizontal support member 3 to pivot about a substantially vertical axis. Pivot point 4 allows horizontal support member 5 to pivot about a substantially vertical axis. Pivot point 6 allows up/down extension arm outer support sleeve 7 to pivot about a substantially vertical axis. Thus, all support members and the up/down extension arm are allowed to pivot freely throughout a 360 degree rotation unless impaired by vehicle structural elements or interference from other apparatus structures.

The up/down extension arm outer support sleeve 7 supports up/down extension arm electric or hydraulic motor assembly 8 which moves up/down extension arm inner sleeve 9 up and down along a substantially vertical axis. This actuator may however be significantly inclined from the vertical axis so as to facilitate out motion in certain vehicle applications, particularly where horizontal support members 5 and 3 are limited in length by vehicle structural constraints.

Securely attached to up/down extension arm inner sleeve 9 is seat support member 10, which may take a variety of configurations depending on the seat and vehicle application involved. Securely attached to seat support member 10 is seat horizontal support member 11 as an immediate means to securely attach seat 13 and seat latch 12.

At this point it should be noted that latch 12B and striker bar assembly 12A afford bidirectional operation and are mounted both to the rear of the seat support member 11 (striker bar 12A) and to base support assembly 1 (latch 12B). Hence, the seat support member 11 and corresponding latch striker bar assembly 12A may be positioned in front of the latch, behind the latch, or secured in the latch 12B.

Figure 2A:
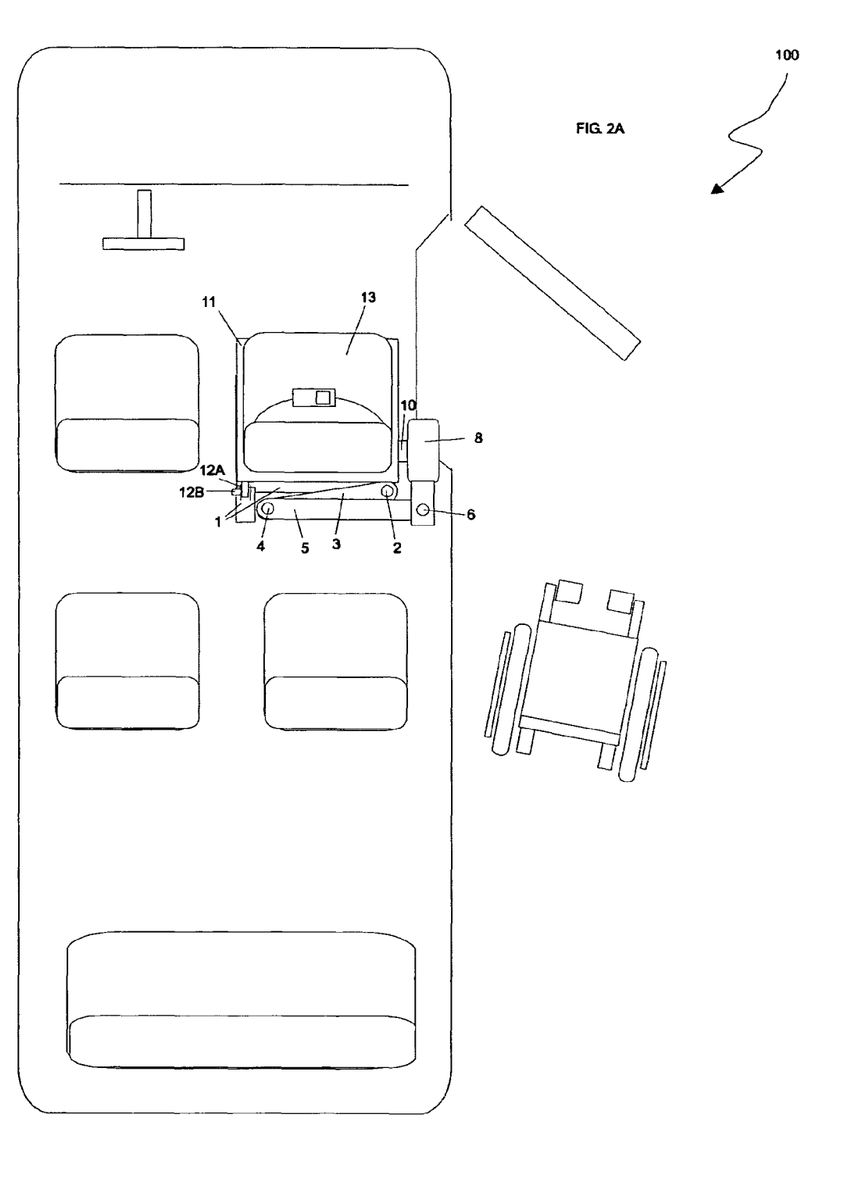
FIG. 2A is a top view of a multiple linkage arm version of a multi-motion lifting and transferring apparatus with the unit fully retracted and forward facing as it would be in a vehicle when traveling in accordance with an embodiment of the present disclosure.
Figure 2B:
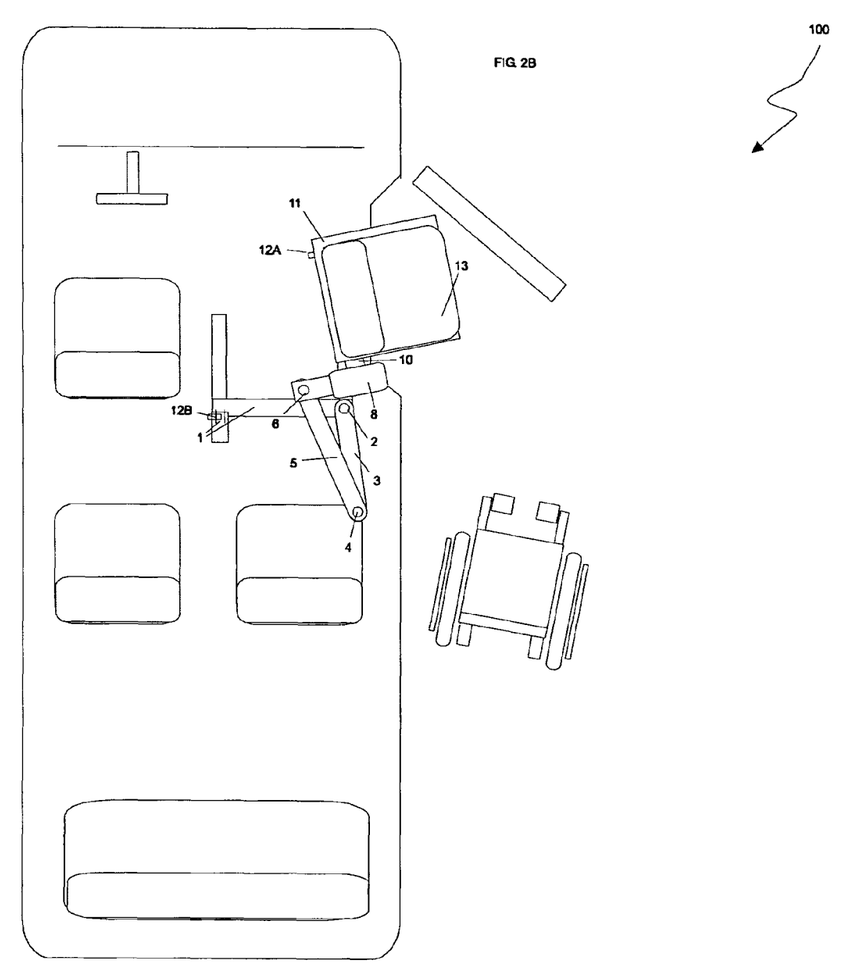
FIG. 2B is a top view of the multi-motion lifting and transferring apparatus shown in FIG. 2A with a resident seat rotated to a ninety degrees position and extended outward and fully lowered in accordance with an embodiment of the present disclosure.
Figure 2C:
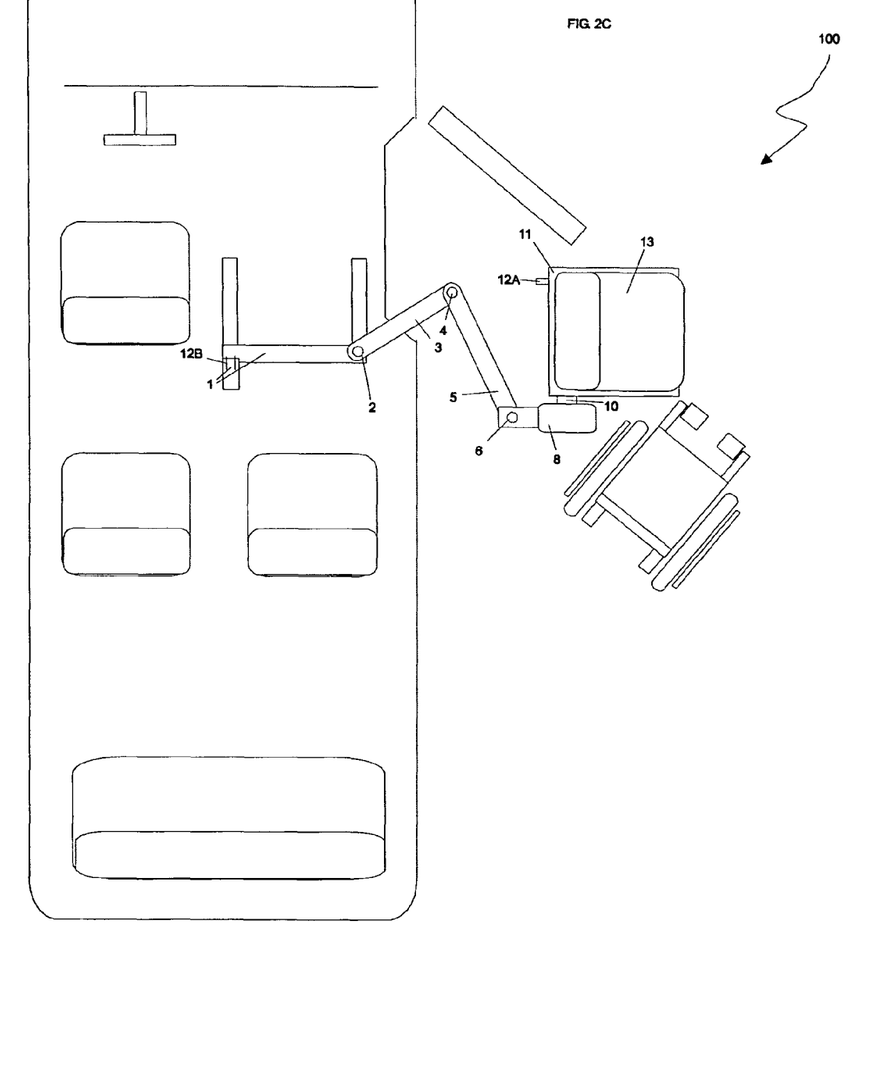
FIG. 2C is a top view of the multi-motion lifting and transferring apparatus shown in FIG. 2A with the resident seat rotated to the ninety degrees position and fully lowered in accordance with an embodiment of the present disclosure.

During typical operation of the apparatus 100, the seat 13 is initially in the latched position, facing in a forward position with the up/down extension arm assembly (7, 8, and 9) fully retracted, with the horizontal support members 5 and 3 in a substantially inboard/outboard orientation with respect to be longitudinal axis of the vehicle as shown in FIGS. 1A and 2A. As the exit process begins, latch assembly 12A and 12B will release and seat assembly 13 will begin to rotate toward a vehicle door opening, and, alternately, if additional legroom is required, seat assembly 13 will begin to move rearward. Rotation will thus begin at this point between up/down extension arm outer support sleeve 7 and horizontal support member 5 via pivot point 6, as shown in FIG. 2B. Additionally, at this time horizontal support member 5 is allowed to pivot along the vertical axis with respect to horizontal support member 3 via pivot point 4 as needed to accomplish the needed motion with respect to a user's ergonomic needs and structural obstacles within the vehicle. As up/down extension arm outer support sleeve 7 and seat assembly 13 finish their pivoting action and begin to exit the vehicle doorway, horizontal support member 3 facilitates their outward motion by rotating outward along the vertical axis of pivot point 2 with respect to base support assembly 1, while simultaneously pivot point 4 allows a rotation of horizontal support member 5 in the opposite direction, thus accomplishing a significant outward motion of the seat 13 as shown in FIGS. 1C and 2C. Once up/down extension arm inner sleeve 9 and seat 13 have adequate clearance to exit the vehicle, up/down extension arm electric or hydraulic motor assembly 8 can begin to drive up/down extension arm inner sleeve 9 in a downward motion, thus lowering seat 13 to a position appropriate for a user to transfer either to a standing position or into a wheelchair. Entry into the vehicle is accomplished by carrying out all of the above listed procedures in the opposite order and direction.

Figure 3A:
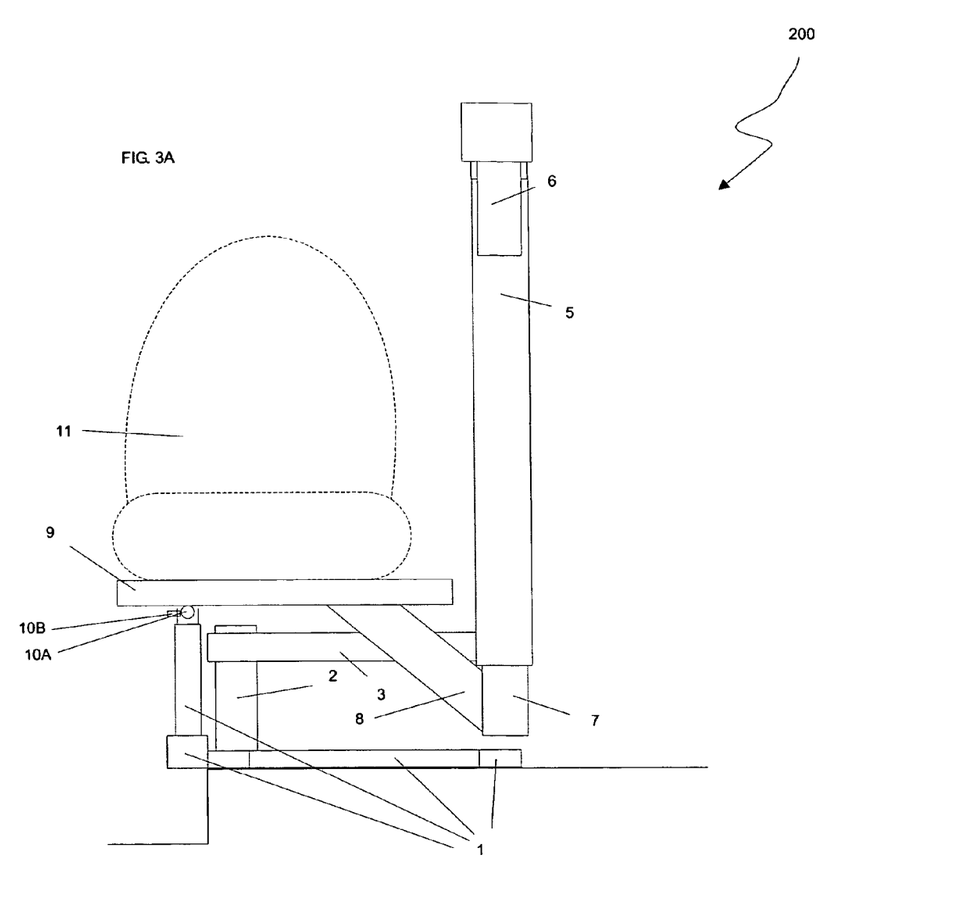
FIG. 3A is a front view of a single linkage arm version of a multi-motion lifting and transferring apparatus with the unit fully retracted and forward facing as it would be in a vehicle when traveling in accordance with an embodiment of the present disclosure.
Figure 3B:
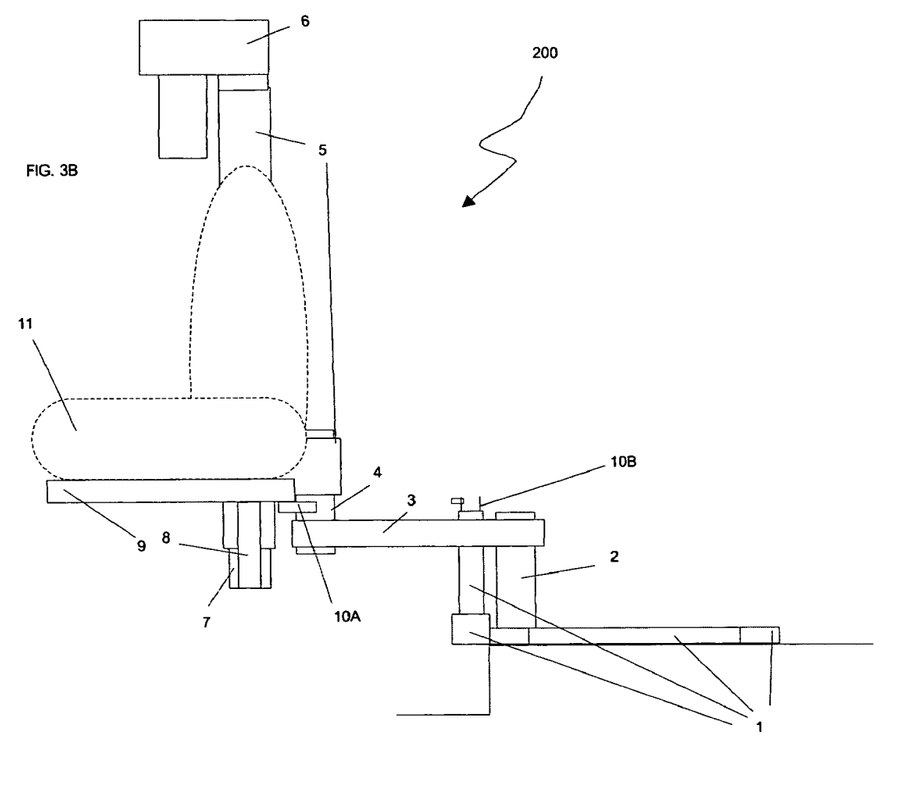
FIG. 3B is a front view of the multi-motion lifting and transferring apparatus shown in FIG. 3A with a resident seat rotated to a ninety degrees position and extended outward and fully lowered in accordance with an embodiment of the present disclosure.
Figure 3C:
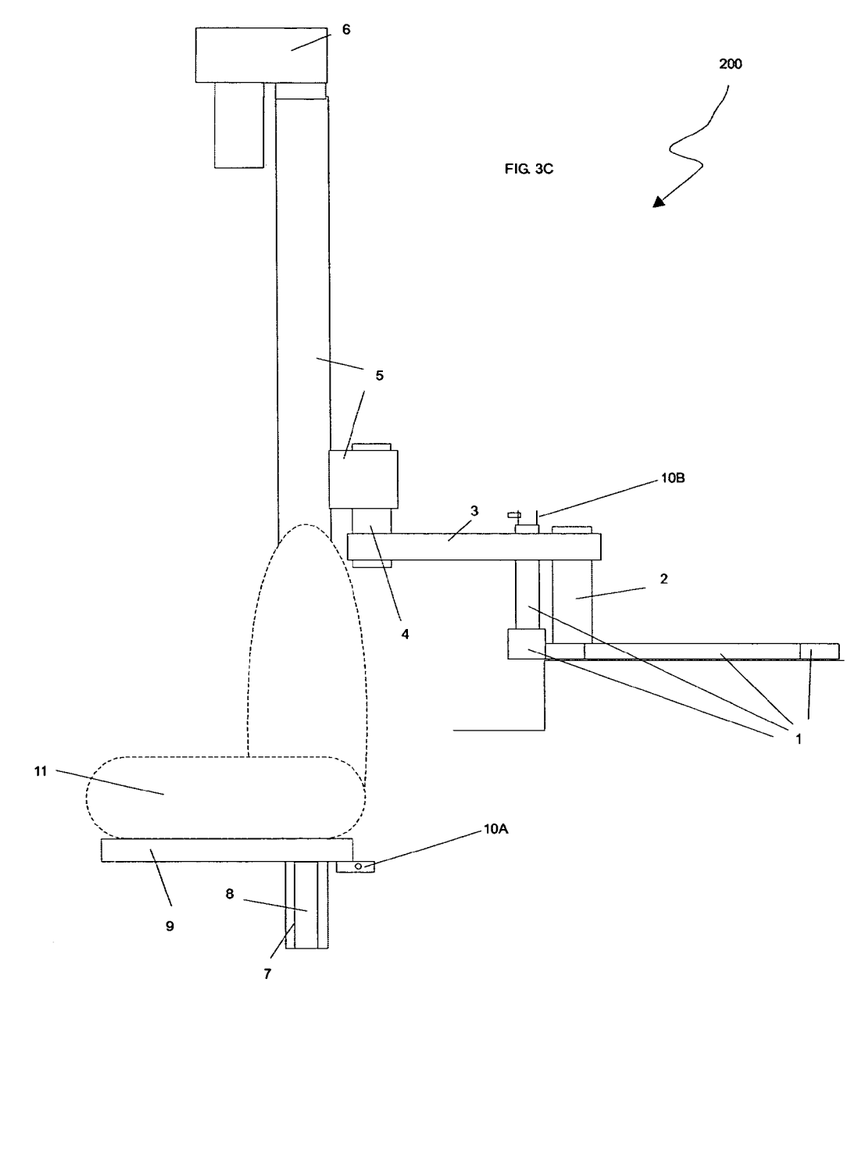
FIG. 3C is a front view of the multi-motion lifting and transferring apparatus shown in FIG. 3A with the resident seat rotated to the ninety degrees position and fully lowered in accordance with an embodiment of the present disclosure.
Figure 4A:
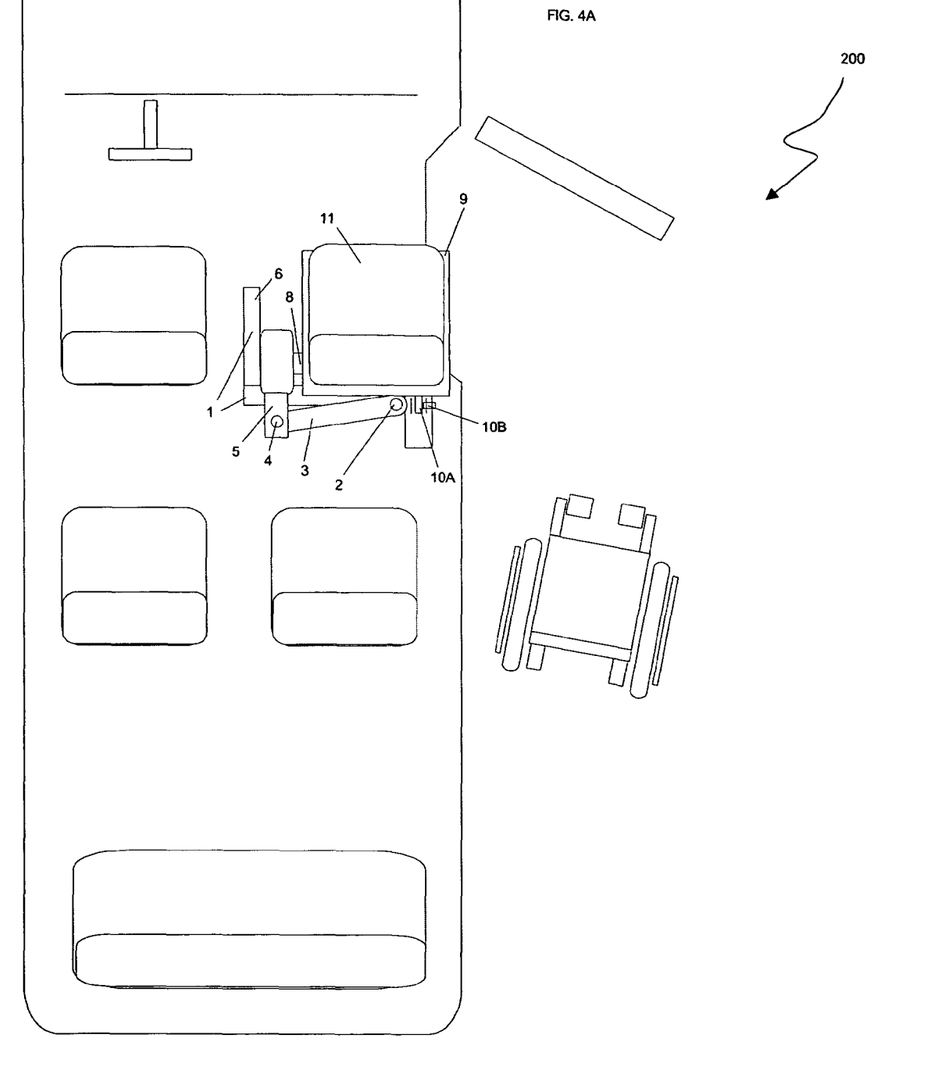
FIG. 4A is a top view of a single linkage arm version of a multi-motion lifting and transferring apparatus with the unit fully retracted and forward facing as it would be in a vehicle when traveling in accordance with an embodiment of the present disclosure.
Figure 4B:
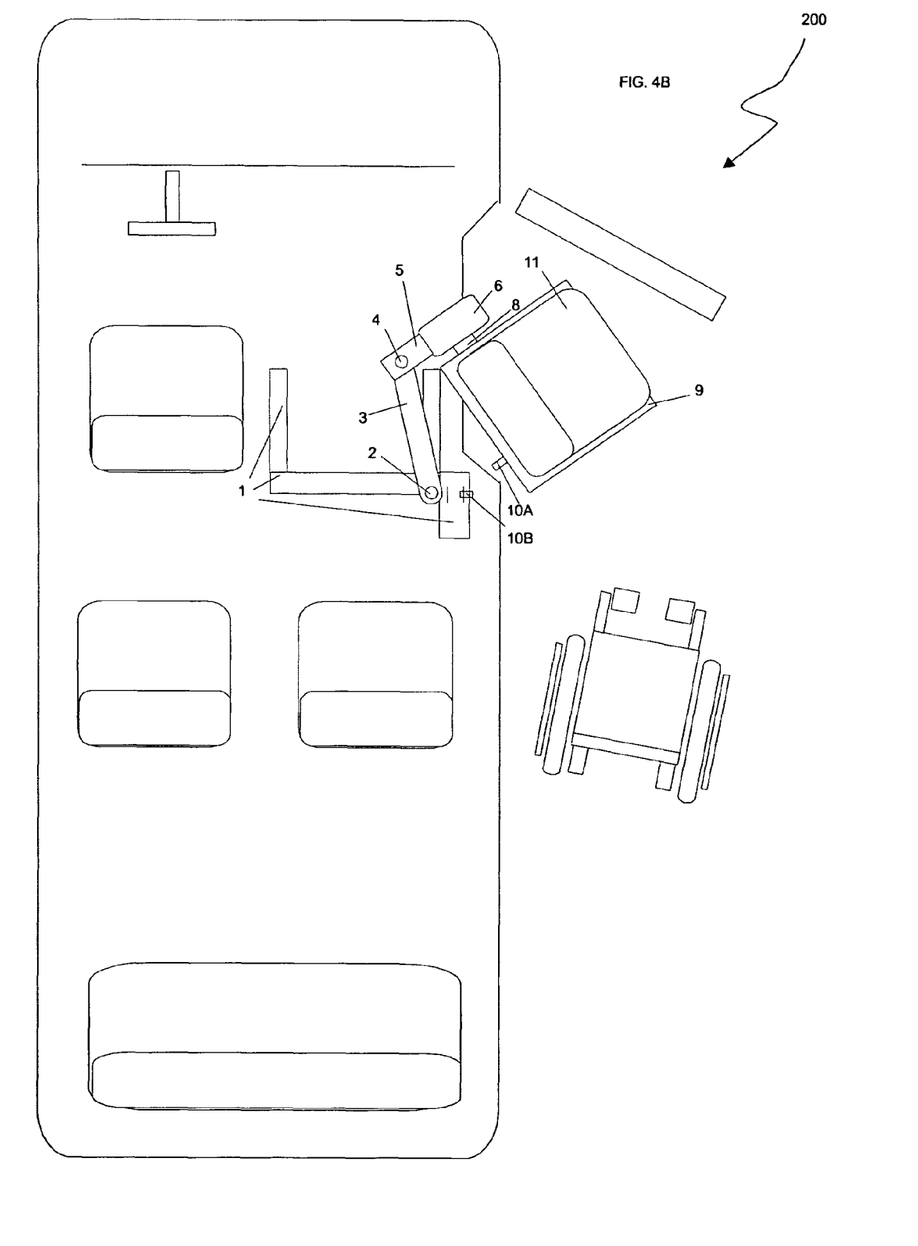
FIG. 4B is a top view of the multi-motion lifting and transferring apparatus shown in FIG. 4A with a resident seat rotated to a ninety degrees position and extended outward and fully lowered in accordance with an embodiment of the present disclosure.
Figure 4C:
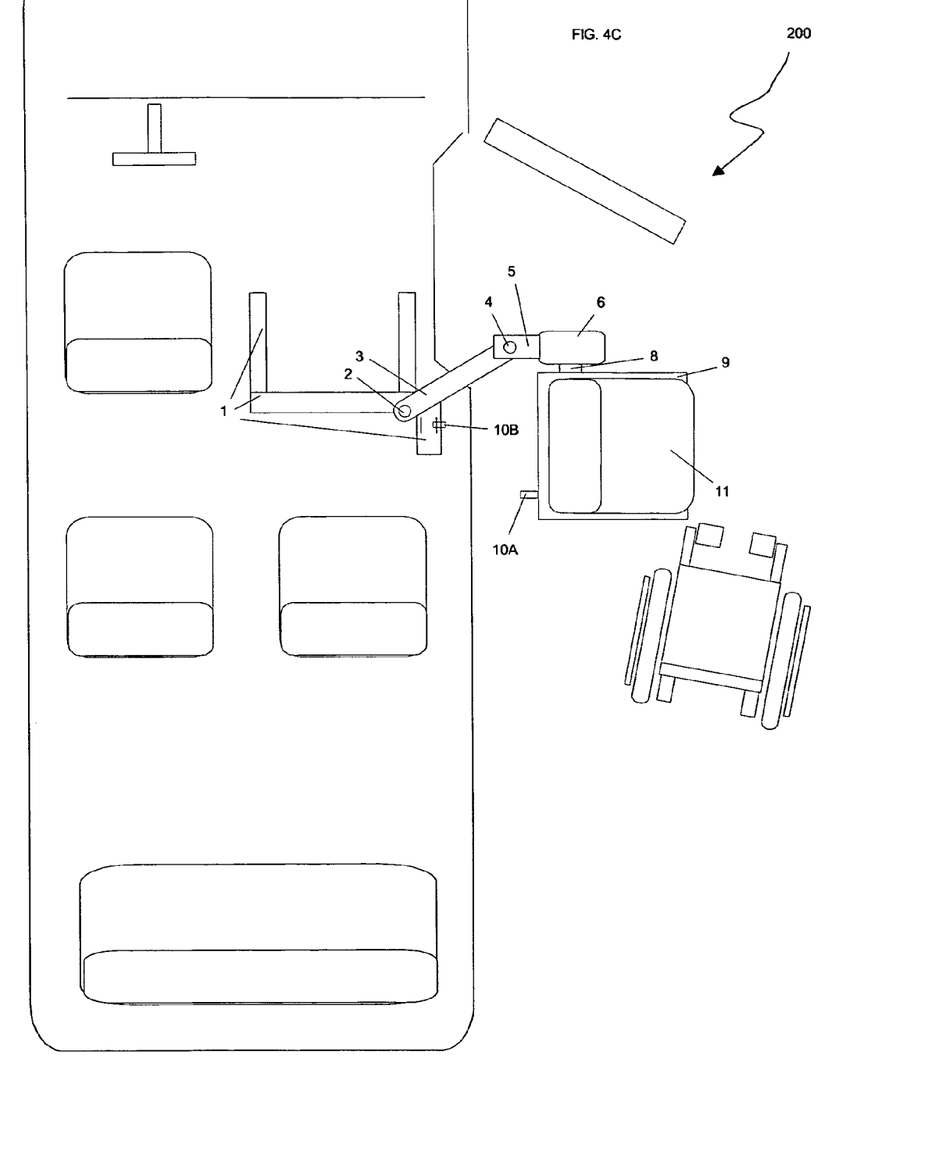
FIG. 4C is a top view of the multi-motion lifting and transferring apparatus shown in FIG. 4A with the resident seat rotated to the ninety degrees position and fully lowered in accordance with an embodiment of the present disclosure.

Referring to FIGS. 3A-3C, there is shown a multi-motion lifting and transferring apparatus 200 in accordance with an alternative embodiment of the present disclosure in three respective positions. During typical operation of the apparatus 200, seat 11 is initially in the latched position, facing in a forward position with up/down extension arm assembly (7, 6, and 5) fully retracted, and horizontal support member 3 in a substantially inboard/outboard orientation with respect to a longitudinal axis of a vehicle as shown in FIGS. 3A and 4A. As the exit process begins, latch assembly 10A and 10B will release and seat assembly 11 will begin to rotate toward a vehicle door opening, and, alternately, if additional legroom is required, seat assembly 11 will begin to move rearward. Rotation will thus begin at this point between up/down extension arm outer support sleeve 5 and horizontal support member 3 via pivot point 4, as shown in FIG. 4B. Additionally, at this time horizontal support member 3 is allowed to pivot rearward along a vertical axis with respect to base support assembly 1 via pivot point 2 as needed to accomplish the needed motion with respect to a user's ergonomic needs and structural obstacles within the vehicle. Once up/down extension arm outer support sleeve 5 and seat assembly 11 have finished their pivoting action and have exited the vehicle doorway and have adequate clearance to exit the vehicle, up/down extension arm electric or hydraulic motor assembly 6 can begin to drive extension arm inner sleeve 7 in a downward motion, thus lowering seat 11 to a position appropriate for a user to transfer either to a standing position or into a wheelchair, as shown in FIG. 4C.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A multi-motion lifting and transferring apparatus for assisting a user in entering and exiting a vehicle through a side door opening thereof comprising:
   a base assembly to mount to a floor of the vehicle;
   at least two support members, including at least:
      a first support member pivotally coupled to the base assembly so as to allow the first support member to rotate about a first substantially vertical axis; and
      a last support member pivotally coupled to a preceding support member so as to allow the last support member to rotate about a last substantially vertical axis; and
   a seat support assembly non-pivotally coupled to the last support member for fixedly supporting a seat for accommodating at least one person;
   wherein the last support member comprises an up/down assembly for substantially vertically raising and lowering the seat support assembly;

wherein the up/down assembly is continuously disposed adjacent to a lateral side of the seat support assembly so as to allow the seat to recline.

2. The apparatus of claim 1, further comprising:
a latch mechanism disposed between the base assembly and the seat support assembly for latching the seat support assembly to the base assembly in a latched position.

3. The apparatus of claim 2, wherein the first support member is disposed vertically lower than the seat support assembly when the seat support assembly is latched to the base assembly so as to allow the seat to recline.

4. The apparatus of claim 2, wherein the latch mechanism is configured to allow the seat support assembly to enter and exit the latched position with respect to the base assembly in a bidirectional manner via multiple horizontal directions.

5. The apparatus of claim 1, wherein the rotation of at least one of the at least two support members about each respective substantially vertical axis is electrically controlled via at least one respective actuator.

6. The apparatus of claim 1, wherein the raising and lowering of the seat support assembly is electrically controlled via an actuator.

7. The apparatus of claim 1, wherein the apparatus further comprises at least one of electrical and optical motion-measuring mechanisms for acquiring information regarding motions of the apparatus so as to allow the apparatus to repeat the motions.

8. The apparatus of claim 1, wherein the at least two support members may be rotated about each respective substantially vertical axis such that the seat may be maneuvered in any horizontal direction.

9. The apparatus of claim 8, wherein the at least two support members may be independently rotated about each respective substantially vertical axis such that the seat maybe maneuvered in any horizontal direction.

10. The apparatus of claim 9, wherein the at least two support members may be simultaneously independently rotated about each respective substantially vertical axis such that the seat may be maneuvered in any horizontal direction.

11. The apparatus of claim 1, wherein the at least two support members are configured to have a vertical profile that permits the seat support assembly to pass substantially horizontally through at least the first substantially vertical axis, above the first support member, when the seat support assembly is raised and rotates with the last support member about the last substantially vertical axis.

12. A multi-motion lifting and transferring apparatus for assisting a user in entering and exiting a vehicle through a side door opening thereof comprising:
a base assembly to mount to a floor of the vehicle;
at least two support members, including at least:
a first support member pivotally coupled to the base assembly so as to allow the first support member to rotate about a first substantially vertical axis; and
a last support member pivotally coupled to a preceding support member so as to allow the last support member to rotate about a last substantially vertical axis; and
a seat support assembly coupled to the last support member for fixedly supporting a seat for accommodating at least one person;
wherein the last support member comprises an up/down assembly for substantially vertically raising and lowering the seat support assembly;
wherein the up/down assembly is continuously disposed adjacent to a lateral side of the seat support assembly so as to allow the seat to recline;
wherein the at least two support members are configured to have a vertical profile that permits the seat support assembly to pass substantially horizontally through at least the first substantially vertical axis, above the first support member, when the seat support assembly is raised and rotates with the last support member about the last substantially vertical axis.

13. The apparatus of claim 12, further comprising:
a latch mechanism disposed between the base assembly and the seat support assembly for securely latching the seat support assembly to the base assembly in a latched position.

14. The apparatus of claim 13, wherein the latch mechanism is configured to allow the seat support assembly to enter and exit the latched position with respect to the base assembly in a bidirectional manner via multiple horizontal directions.

15. The apparatus of claim 12, wherein the rotation of at least one of the at least two support members about each respective substantially vertical axis is electrically controlled via at least one respective actuator.

16. The apparatus of claim 12, wherein the raising and lowering of the seat support assembly is electrically controlled via an actuator.

17. The apparatus of claim 12, wherein the at least two support members may be rotated about each respective substantially vertical axis such that the seat may be maneuvered in any horizontal direction.

18. The apparatus of claim 17, wherein the at least two support members may be independently rotated about each respective substantially vertical axis such that the seat may be maneuvered in any horizontal direction.

19. The apparatus of claim 18, wherein the at least two support members may be simultaneously independently rotated about each respective substantially vertical axis such that the seat may be maneuvered in any horizontal direction.

20. The apparatus of claim 12, wherein the seat support assembly is non-pivotally coupled to the last support member for supporting the seat for accommodating the at least one person.

* * * * *